United States Patent [19]
Coleman et al.

[11] Patent Number: 5,586,251
[45] Date of Patent: Dec. 17, 1996

[54] CONTINUOUS ON-LOCAL AREA NETWORK MONITOR

[75] Inventors: James A. Coleman, Newtown, Pa.; Paul F. Sass, Freehold, N.J.; Frank J. Halloran, Spotswood, N.J.; Allan T. Senesey, Freehold, N.J.

[73] Assignee: The United States of America as represented by the Secretary of the Army, Washington, D.C.

[21] Appl. No.: 62,358

[22] Filed: May 13, 1993

[51] Int. Cl.$^6$ .................................................. G06F 11/00
[52] U.S. Cl. ................................................... 395/183.19
[58] Field of Search ........................... 371/20.1; 370/13; 364/268.9; 395/183.19, 182.02, 183.01, 183.03, 183.15, 183.16

[56] References Cited

U.S. PATENT DOCUMENTS 4,105,900  8/1978  Martin et al. .
4,271,505  6/1981  Menot et al. .

*Primary Examiner*—Robert W. Beausoliel, Jr.
*Assistant Examiner*—Norman M. Wright
*Attorney, Agent, or Firm*—Michael Zelenka; William H. Anderson

[57] ABSTRACT

A monitoring system for a network having a plurality of segments including a plurality of identical monitoring instruments respectively connected to the segments. Each monitoring instrument includes an interconnection circuit card for connecting to its segment, a microcomputer circuit card connected to the interconnection circuit card, an interface circuit card connected to the microcomputer circuit card, a plurality of status lamps respectively connected to the interface circuit card, a plurality of switches for providing self testing, resetting, alarm, instrument selecting, segment selecting, connected to the interface circuit card, and a plurality of switches for providing transmit/receiving or transmitting only, a monitor mode, a verify mode, and an auto fault mode, connected to the interface circuit card.

9 Claims, 2 Drawing Sheets

CONTINUOUS ON-LOCAL AREA NETWORK MONITOR

GOVERNMENTAL INTEREST

The invention described herein may be manufactured, used and licensed by or for the United States Government without the payment to us of any royalty thereon.

FIELD OF THE INVENTION

The invention relates in general to an Ethernet local area network monitoring system, and more specifically relates to an Ethernet network monitoring system having identical monitoring instruments numbering from two to thirty-two, each one capable of functioning as a monitor, detector, alarm and managing tool when connected to different points on a single Ethernet cable segment or connected to a plurality of Ethernet cable segments which are connected together and fault isolated by Ethernet repeaters and/or Ethernet fiber optic transceivers.

BACKGROUND OF THE INVENTION

The term, "Ethernet" refers to a local area network protocol which uses a carder sense multiple access with a collision detection scheme to arbitrate the use of a network cable segment or segments for the transmission and reception of digital packets at a rate of 10 Mb/s. Ethernet is implemented on thick wire or thin wire coaxial cable, unshielded or shielded twisted-pair cable, fiber optic cable, satellite, and microwave links. The Ethernet protocol is defined and regulated by the IEEE 802.3 standard.

The prior art Ethernet monitoring systems generally include a plurality of monitoring devices each with their own physical address, connected to a single segment or connected to respective segments of a local area network which is compatible with a selective IEEE standard, and includes a single terminal work station consisting of a personal computer and display also connected to the local area network and diagnostic software to manage and interrogate the monitoring devices.

However, these prior art monitoring systems with multiple monitors are generally complex and costly. In order for these monitoring systems to function, each monitoring device must have a unique physical address and the terminal work station must have prior knowledge of the physical address of each monitoring device or the management software to request and compile the physical addresses of all the monitoring devices. Further, these monitoring systems require expensive diagnostic software and specialized training for personnel to operate the terminal work station and software. Furthermore, the fault detection, display and alarm functions of these monitoring systems are generally resident at a single terminal work station which usually is remote distance from the segment which becomes faulty. This causes a maintainability time delay in fault identification and alerting as well as necessitating a visit to the station for reprogramming every time an additional monitoring device is added, removed or adjusted.

Other prior art monitoring systems consist of a single monitor and a scanner. However, because the number of monitors is necessarily limited to one and the alarm and display functions are only in a remote scanner device, these systems, as with the other prior art monitoring systems, have a time delay in fault identification and alerting. Furthermore, the monitoring system is controlled by the scanner device and the monitoring system can only be reset or shutdown by the scanner device which requires a visit to the location of the scanner.

SUMMARY OF THE INVENTION

Accordingly, an object of the present invention is to monitor an Ethernet local area network which may consist of a single cable segment or more elaborate networks in which cable segments are located at remote distances from each other.

Another object is to provide a monitoring system, which is not terminal-based and which does not require complex software, and which does not require highly trained, operating personnel therefor.

Still another object is to provide an Ethernet monitoring system to detect and isolate shorted or improperly terminated cable segments or defective equipment connected to cable segments.

The present invention accomplishes these and other objectives by establishing and maintaining constant periodic communication among a group of identical monitoring instruments via status messages as a background process to assure that the local area network is operational and free of faults such as shorts in cable segments, improperly terminated cable segments, or defective equipment connected to cable segments.

All monitoring instruments according to the present invention can independently detect the absence of proper periodic status message communication between all instruments and sound alarms to indicate that a fault exists somewhere in the network. For networks that have fault isolation between the cable segments, the monitoring instruments are also able to identify the faulty cable segment.

The invention transmits and receives Ethernet digital packets which consist of the following major fields: preamble, destination address, source address, and data. The destination address, multicast or physical, indicates the destination of the packet on the network and is used to filter unwanted packets from reaching a node. The present invention, accordingly, includes a plurality of identical monitoring instruments which all have the same physical or multicast address so that every status message sent by a monitoring instrument is received by all the remaining monitoring instruments. Of course, as those skilled in the art will appreciate, this physical or multicast address for this group of monitoring instruments must be unique from any other working station's address on the network.

The group of monitoring instruments, according to the present invention, are connected to respective points on a single segment local area network or connected to respective segments of a multi-segment local area network. Each identical monitoring instrument comprises, an interconnection card for making a local area network segment interconnection, a microcomputer card which includes an input and output port and which is connected to the interconnection card, and an interface circuit card which is connected to the microcomputer card. The interface circuit card is also connected respectively to reset switch means, to alarm switch means, to monitoring instrument select switch means, to network segment select switch means, to segment set switch means, to lamp means for indicating fault or standby or operate status, to single fault/double fault switch means, and to mode switch means for providing a monitor mode, a verify mode, or an auto fault mode.

By using an Ethernet monitor according to the present invention several problems existing in the prior art are avoided such as: complex, terminal-based monitoring system; unique physical or multicast addresses for each monitoring device; diagnostic software; personnel with specialized training to operate the terminal work station; manually alerting personnel of a detected fault condition; and time delays associated with this delayed communication; and visiting the terminal work station every time an additional monitoring device is added, removed, or adjusted.

BRIEF DESCRIPTION OF THE DRAWINGS

The foregoing and other objects, features and advantages will be apparent from the following description of the preferred embodiment of the invention as illustrated in the accompanying drawings.

DESCRIPTION OF THE PREFERRED EMBODIMENTS

Figure 1:
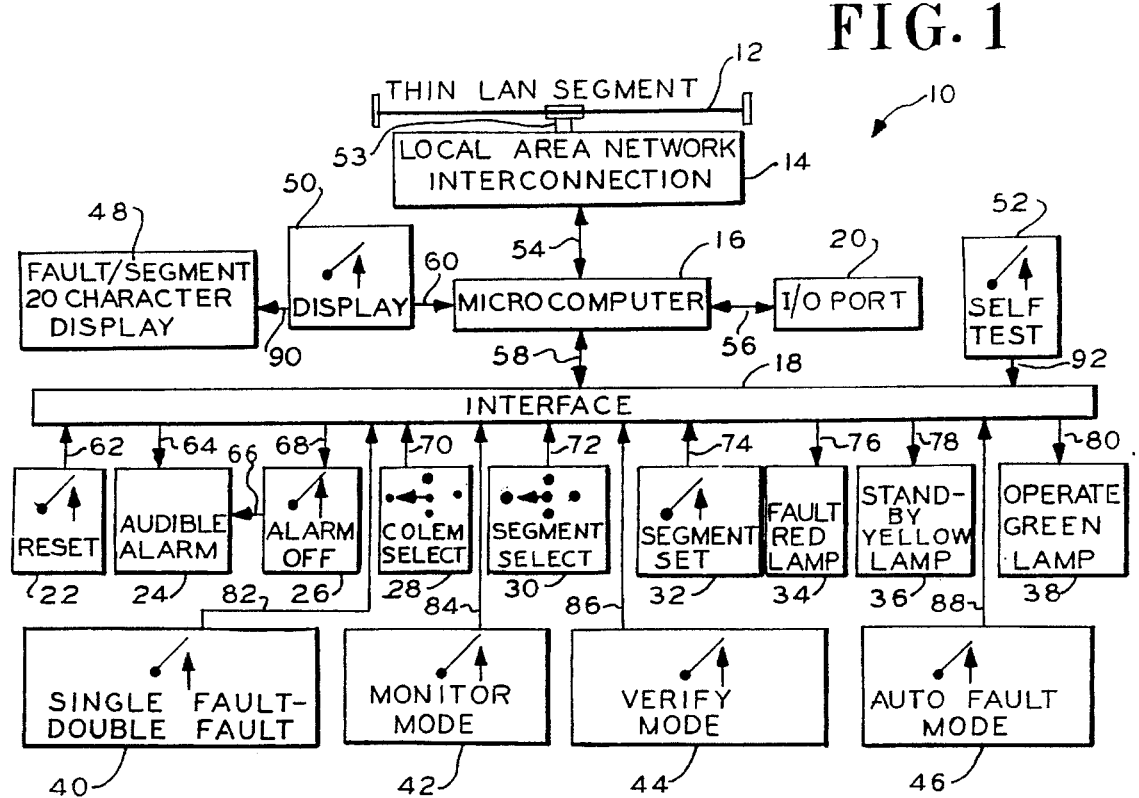
FIG. 1 is a schematic block drawing of a monitoring instrument for a monitoring system according to the present invention.

As shown in FIG. 1, a monitoring instrument, or continuous on-local area network-Ethernet monitor (COLEM) 10 is provided. Monitor 10 connects to a network cable segment, or local area network (LAN) segment consisting of thick wire or thin wire coaxial cable, or segment 12. (Ethernet is defined as a local area network, which is compatible to the IEEE 802.3 standard and may consist of a single segment or multi-segments that are isolated by repeaters or fiber optic transceivers.)

Generally, monitor 10 includes a local area network interconnection circuit card 14, a microcomputer circuit card 16 connected to the interconnection circuit card 14, a display switch 50 and display 48 attached to the microcomputer 16, an input and output (I/O) port 20, and an interface circuit card 18 also connected to the microcomputer 16.

Selectively interfaced with the microcomputer 16 through interface circuit card 18 are a reset switch 22, an audible alarm 24, an alarm OFF switch 26, a COLEM number select thumbnail switch 28, a segment number select thumbnail multi-function switch 30, a segment set switch 32, a fault red lamp 34, a standby yellow lamp 36, an operate green lamp 38, a single fault/double fault switch 40, a monitor mode switch 42, a verify mode switch 44, an auto fault mode switch 46, and a self-test switch 52. Switches 22, 26, 28, 30, 32, 40, 42, 44, 46 and 52 are all connected to interface card 18 via conductors 62, 68, 70, 72, 74, 82, 84, 86, 88, and 92, respectively. Similarly, lamps 34, 36, 38 and alarm 24 are connected to interface card 18 via conductors 76, 78, 80 and 64, respectively.

Interconnection card 14 is connected to segment 12 via connector 53. Two way cables 54, 56, and 58 connect microcomputer 16 to card 14, I/O port 20, and interface card 18, respectively. Two single way cables 60 and 90 coupled over display switch 50 connect character display 48 to microcomputer 16.

An example of an interconnection card which may be utilized as card 14 is an interconnection card sold by Western Digital under the trademark name of EtherCard PLUS, part no. WD8003E. Similarly, an example of a microcomputer card which may be utilized as microcomputer 16 is a microcomputer card sold by Motorola Corporation sold as, part no. M68HC11EVB. Interface card 18 is a custom designed interface card of conventional construction. Input/output port 20 is utilized for selective communications with microcomputer card 16.

The functions of the various switches, alarms and lamps are explained as follows: reset switch 22 initiates a standby state; audible alarm 24 sounds when faults are detected and alarm OFF switch 26 quiets the audible alarm 24 after its sounding; COLEM select thumbnail switch 28 enters the total number of COLEM instruments in its respective network; segment select thumbwheel multi-function switch 30 either (a) enters the segment number being monitored or (b), enters the total number of segments in its respective network; segment set switch 32 sets the segment number being monitored into instrument 10; fault red lamp 34 indicates the fault state when faults are detected; standby yellow lamp 36 indicates a standby state or reset condition; operate green lamp 38 indicates a normal operating state when no faults are detected; single fault/double fault switch 40 sets the fault tolerance of monitor 10 when it is operating in the MONITOR MODE; monitor mode switch 42 initiates an automatic periodic monitoring by transmission-reception of status messages between all segments and all monitors; verify mode switch 44 initiates manual system verification by transmission/reception of one status message between all segments and all COLEM instruments; auto fault mode switch 46 initiates network fault isolation by automatic transmission/reception of status messages between all segments and all COLEM instruments; and self test switch 52 initiates an internal self test.

In operation, fault/segment 20-Character Display 48 displays the following: (a) the number of faulty receptions from segments and COLEM instruments, (b) a list identifying properly received status messages from segments and COLEM instruments, or (c) internally stored segment number being monitored. Display switch 50 selects appropriate 20 character output messages to be displayed on the display.

Figure 2:
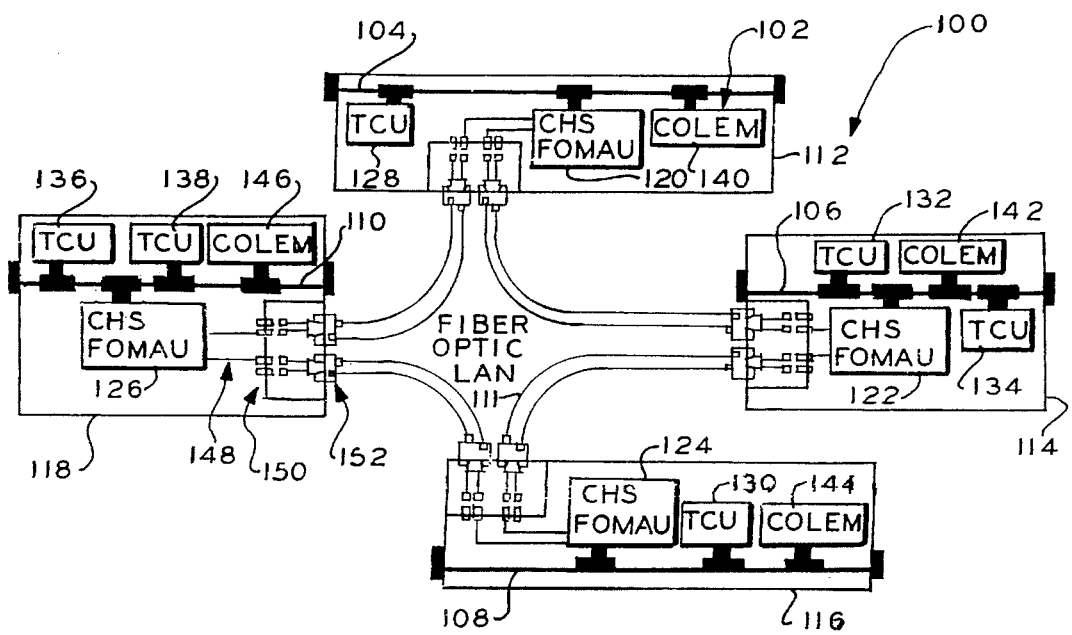
FIG. 2 is a schematic block drawing of a first network having a monitoring system according to the present invention.

To explain the operation of monitor 10 a typical network 100 is illustrated in FIG. 2. As shown, network 100 is essentially comprised of segments 104, 106, 108 and 110, all of which are interconnected via a fiber optic local area network, or fiber optic LAN 11. Segments 104, 106, 108, 110 are isolated from one another via respective shelters 12, 114, 116, 118. Connected to each segment are fiber optic medium attachment units (FOMAU) 120, 122, 124, and 126 which are in turn coupled to fiber optic LAN 111 via fiber cables 148, feed thru units 150 and bulkhead adapters 152. The FOMAUs are necessary for any ethernet/fiber optic LAN connection as these units convert the various signals for transmission over the two different media. Also as shown in this LAN configuration, respective pairs of transportable computer units (TCUs) 136, 138, and 132, 134 are attached to segments 110 and 106. Similarly, respective TCU's 130 and 128 are attached to segments 108 and 104.

Monitoring system 102 is comprised of continuous on-LAN Ethernet monitors 140, 142, 144, and 146 which are connected to segments 104, 106, 108, and 110, respectively. Monitors 140, 142, 144, 146 are each identical to instrument 10, which is shown in FIG. 1. Thus, FIG. 2 shows COLEM instruments 140, 142, 144, 146, which are all interconnected by respective FOMAU units 120, 122, 124, 126.

In operation, all COLEM instruments function as a monitor, detector, alarm and managing tool. Each monitor has three operating configurations: (1) MONITOR MODE, which automatically transmits/receives periodic status messages between all segments for the purpose of detecting Ethernet network faults during normal operation; (2) VERIFY MODE, which manually transmits/receives one status message between all segments for the purpose of Ethernet network verification before network monitoring is initiated; and (3) AUTO FAULT MODE, which automatically transmits periodic status messages and listens for any response from any COLEM for the purpose of isolating faulty Ethernet segments/equipment after an Ethernet network problem has been detected during monitoring.

In operation, each monitor has three operational states: (1) "OPERATE" or green for no faults detected; (2) "STANDBY" or yellow for reset; and (3) "FAULT" or red for faults detected.

The major operating modes of the monitor according to the present invention are described hereafter. Although the present invention obviously requires internal software, those skilled in the art would be able to readily create the necessary software given the following description of the operation of the monitor.

MONITOR MODE

Initially to set up the monitoring system according to the present invention, it is necessary to assign an arbitrary number to each segment in the Ethernet network for fault identification purposes. One or more COLEM's should be electrically installed on each segment of the Ethernet network and the assigned number for each segment should be entered into the COLEM which is monitoring that segment using the appropriate switches 30 and 32.

One of the installed COLEM's is selected to originate monitoring and the total number of segments and the total number of COLEM's in the Ethernet network must be entered only into this COLEM using the appropriate switches 28 and 30 followed by monitor initiation using switch 42.

In operation, each COLEM automatically transmits, at synchronized periodic intervals (for example every 1.0 sec), a single status message which is received and reviewed independently by all other COLEM's in the network. All COLEM's have the same physical or multicast address and will receive a separate individual message from all the other COLEM's at the selected periodic interval (the received message number is obviously equal to one less than the total number of COLEM's in the Ethernet network). One COLEM in the system, however, must act as a master unit when first initiated in the monitor mode, while the remaining COLEM's act as slaves. The only difference between the master and slaves is merely that the master COLEM is the COLEM which was initiated first and therefore, queries the remaining COLEM's for a response. Thus, any of the COLEM's may be the master provided it is initiated first. Because all the COLEM's each have the same address, all of the COLEM's receive the responses and queries of all other COLEM's. Obviously, because this system may inherently cause conflicts in receipt of responses, differing individual time delays for responses provided in each COLEM. This can be accomplished by ordering the time delays for each COLEM according to some individual number assigned to the COLEM, for example the serial number given the COLEM. Thus, the COLEM's could have any subsecond time delay to prevent data being received by any COLEM at the same time.

When the originating COLEM receives the proper number of segment/COLEM return status messages, all the COLEM's in the Ethernet network will automatically go to the "OPERATE" state with their OPERATE green lamp on.

When a COLEM does not receive the required number of appropriate status messages during monitoring, its alarm is sounded and it automatically goes to the "FAULT" state with its FAULT red lamp on. In each COLEM which detects the missing status messages, the number of non-reporting segments are identified and displayed in each detecting COLEM.

When a COLEM is reset during the MONITOR MODE, it will initially send a reset command to all the other COLEM's in the network and they will automatically go to the "STANDBY" state with their yellow STANDBY lamp on. This prevents an erroneous fault detection by other COLEM's in the network. When a COLEM detects missing status messages from segments/COLEM's during the MONITOR MODE, it will also save the fault information for review and stop monitoring. Each time the DISPLAY switch is depressed, the return status message(s) from another segment are displayed. After a COLEM has detected faults during the MONITOR MODE, it cannot return to active monitoring until the Ethernet network is verified in proper condition using the VERIFY MODE procedure initiated from any COLEM in the Ethernet network. After successful verification, the MONITOR MODE procedure would be initiated again from any COLEM in the Ethernet network.

In the MONITOR MODE, a fault tolerance provision is provided by the single fault/double fault switch 40 to insure reliability of COLEM instruments during the continuous operation. When switch 40 is set to single fault, all instruments will sound an alarm when a single fault is detected by any monitor. When switch 40 is set to double fault, all instruments will only sound an alarm when two faults in succession are detected by any monitor. This may be done at any time prior to initiating or during MONITOR MODE and must be set on all the COLEM instruments to be effective. It can be set sequentially one instrument at a time and does not have to be set simultaneously.

VERIFY MODE

At operator request from a single COLEM, a verify command may originated and sent to all COLEM's in the Ethernet network. Upon receipt, each COLEM transmits a single return status message. When the originating COLEM does not receive the required number of appropriate return status messages, a short alarm is sounded in all the COLEM instruments and the number of reporting segments and COLEM's are displayed in all the COLEM instruments.

The VERIFY MODE is considered manual because a single status message is transmitted for each operator request. Network verification may be done at any time on a partial or total Ethernet network. VERIFY MODE may be initiated from any COLEM in the Ethernet network by sending a verify command from an originating COLEM to all other COLEM's in the Ethernet network; and upon receipt of the verify command, each COLEM responds with a single status message. When each COLEM instrument does not receive the required number of appropriate return status messages, the fault red lamp is turned on and one short alarm sounds and the number of received status messages and segments are displayed.

After verification, an originating COLEM will be in the "STANDBY" state with their STANDBY yellow lamp on and alarm off. It will remain in the "STANDBY" state until the Ethernet network is monitored in the procedure described above titled MONITOR MODE.

As shown in FIG. 2, if one COLEM each was connected to segments 104, 106, 108 and 110, the response would be: RECEIVE SEG-4 COL4.

Each time the DISPLAY switch is depressed, the return status message(s) from another segment are displayed; until all returns are reviewed and then the process may be repeated; display example sequence for the various segments responding (one COLEM installed per segment): i.e. the first display request: SEGMENT 104 COL-1; second display request: SEGMENT 106 COL-1; third display request: SEGMENT 108 COL-1; fourth display request: SEGMENT 110 COL-1; and fifth display request: RECEIVE SEG-4 COL-4; and the display procedure sequence will repeat.

Each time the DISPLAY switch is depressed, the return status message(s) from another segment are displayed; until all returns are reviewed and then the process may be repeated. Partial network verification may be accomplished at any time from any COLEM during the configuration of the Ethernet network to insure that a new segment is added properly or an old segment is removed completely. It is noted that the VERIFY MODE may be used at any time from any COLEM during the configuration of the Ethernet network to insure that a new segment is added properly or an old segment is removed completely. In the VERIFY MODE, the operator is required to initiate each status message transfer.

AUTO FAULT MODE

At synchronized periodic intervals (for example, every 1.0 sec), each COLEM automatically transmits a single status message intended for reception by all other COLEM's in the Ethernet network. If a COLEM does not receive any status messages from other COLEM's, one short alarm is sounded and a message is displayed to indicate that no status messages have been received. The process of transmission and attempted reception is repeated for every periodic interval. If one or more status messages are received, three short alarms are sounded and the number of reporting segments and COLEM's are identified and displayed in each COLEM that received status messages.

In the AUTO FAULT MODE, the status message transmission is automatically performed which allows the operator hands free operation while the fault is being traced. When the fault is located, the alarm pattern changes from one short alarm to three short alarms. Whenever the Ethernet network is altered or a COLEM is added or removed, the MONITOR MODE can be reset and quickly initialized to the new network configuration from any COLEM. The operational details and displays, including alarm defeat details will follow.

Network auto faulting permits the use of hands free instrument operation during the tracing and identification of faulty Ethernet equipment and cables. After initiation, the AUTO FAULT MODE will function automatically until the RESET switch is depressed. This provides a periodic fault alert alarm until the Ethernet network problem is corrected or removed. Unlike the verify modes in which only one short alarm is sounded when the actual return status messages do not match the expected return status messages set by the SEGMENT SELECT and COLEM SELECT thumbwheel switches, the AUTO FAULT MODE automatically sends a periodic STATUS message and listens for any response from any COLEM. If no return status messages are received, the COLEM sounds one short alarm every 0.5 sec and the FAULT red lamp also blinks. At the instant one or more status messages are received by any COLEM, the alarm pattern is changed from one short alarm to three short alarms every 0.5 sec, the FAULT red lamp is turned off and the GREEN operate lamp blinks. The AUTO FAULT MODE expedites the process of fault location because the COLEM alarm pattern changes instantly when the fault is corrected or removed.

Figure 3:
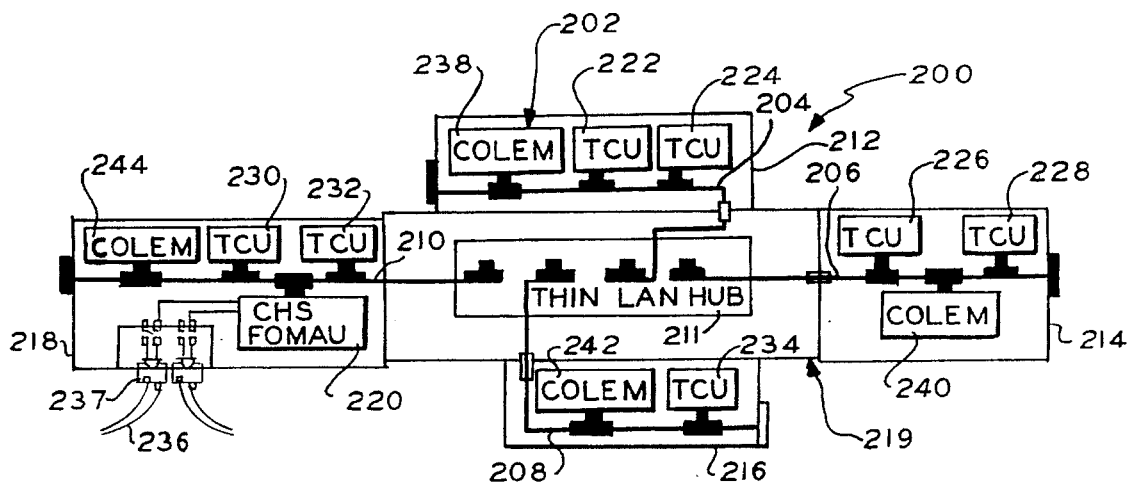
FIG. 3 is a schematic block drawing of a second network embodiment having a monitoring system according to the present invention.
Figure 4:
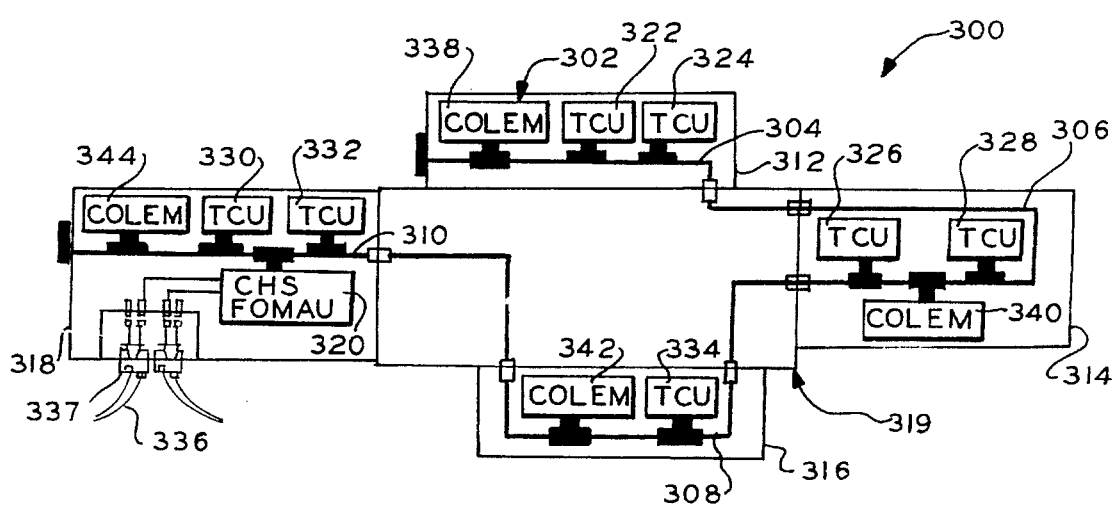
FIG. 4 is a schematic block drawing of a third network embodiment having a monitoring system according to the present invention.

An example of other LANs are shown in FIGS. 3 and 4. As shown in FIG. 3, a second embodiment or network 200 is provided. Network 200 has a monitoring system 202. Network 200 has a first segment 204, a second segment 206, a third segment 208, and a fourth segment 210. Network 200 also has a thin LAN hub or thin local area network (LAN) hub 211. Segments 204, 206, 208, 210 have respective first and second and third and fourth shelters 212, 214, 216, 218. Hub 211 has a tent 219. Fourth segment 210 has a fiber optic medium attachment unit (FOMAU) 220. First and second and fourth segments 204, 206, 210 have respective pairs, or first and second, TCU's 222, 224 and 226, 228 and 230, 232. Third segment 208 has only a first TCU 234. FOMAU 220 of fourth segment 210 is connected to a fiber optic LAN unit 236, which can connect to other tent clusters (not shown) through a bulkhead adapter 237. Monitoring system 202 has a first COLEM instrument 238, a second COLEM instrument 240, a third COLEM instrument 242, and a fourth COLEM instrument 244, which are connected to respective segments 204, 206, 208,210. monitors 238, 240, 242, 244 are each identical to instrument 10, which is shown in FIG. 1. Thus, FIG. 3 shows COLEM instruments 238,240, 242, 244, which are used in respective shelters 212, 214, 216, 218, that are connected to thin LAN hub 211.

As shown in FIG. 4, a third embodiment or network 300 is provided. Network 300 has a monitoring system 302. Network 300 has a first segment portion 304, and a second segment portion 306, and a third segment portion 308, and a fourth segment portion 310, which together form an elongate segment 311. Segment portions 304, 306, 308, 310 have respective shelters 312, 314, 316, 318, which join to a central tent 319. Fourth segment portion 310 has a FOMAU unit 320. First and second and fourth segment portions 304, 306, 310 have respective first and second, or pairs, of TCU's 322, 324 and 326, 328 and 330, 332. Third segment portion 308 has a single or first TCU 334 only. FOMAU unit 320 is connected to a fiber optic LAN unit 336, which can connect to other tent clusters (not shown) through a bulkhead adapter 337.

Monitoring system 302 has a first COLEM instrument 338, a second COLEM instrument 340, a third COLEM instrument 342, and a fourth COLEM instrument 344. Monitors 338,340, 342, 344 are connected to respective segment portions 304, 306, 308, 310. monitors 338, 340, 342, 344 are each identical to instrument 10, which is shown in FIG. 1. Thus, FIG. 4 shows COLEM instruments 338,340, 342, 344, which are used on respective shelters 312, 314, 316, 318, that are connected to the single elongate segment 311.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A monitoring system for a network comprising:

a plurality of network segments;

a plurality of identical monitoring instruments connected to the network segments at distances remote from one another, each monitoring instrument having identical destination addresses a means to uniquely identify each monitoring instrument for use in responding to a status query a fault tolerance provision, an interconnection circuit card connected to its respective segment, a microcomputer circuit card connected to the interconnection circuit card and an interface circuit card connected to the microcomputer circuit card and a switch means;

wherein said plurality of monitoring instruments are respectively connected to the plurality of segments to detect faults in the segments such as shorts or improper terminations or defective equipment connected to the segments by continuously sending a periodic status message signal which includes a preamble, a destination address, source address, and time data; and wherein the status signal is received by the plurality of monitoring instruments at the same time.

2. The system of claim 1, wherein the switch means comprises a plurality of switches including a self test switch and a resetting switch, an alarm switch, an instrument select switch, and a segment select switch.

3. The system of claim 1, wherein the switch means comprises a plurality of switches including a single fault or double fault switch, a monitor mode switch, a verify mode switch, and an auto fault switch.

4. The system of claim 1, wherein the monitoring instrument has a plurality of lamps including a fault red lamp, a standby yellow lamp, and an operate green lamp respectively connected to the interface circuit card.

5. The system of claim 1, wherein the microcomputer card is connected to a display switch which is connected to a fault/segment display.

6. The system of claim 1, wherein the segments have respective shelters, said segments having respective fiber optic medium attachment units, said attachment units being connected to a fiber optic local area network unit, and wherein its segments each has at least one TCU unit.

7. The system of claim 1, wherein the segments have respective shelters, and said segments each is connected to a local area network hub, and wherein the segments each has at least one TCU unit.

8. The system of claim 1, wherein the segments from portions of a single elongate segment assembly, and wherein each segment portion has at least one TCU unit.

9. The system of claim 1, wherein one of said segments has a fiber optic medium attachment unit, said attachment unit having a bulkhead adapter for connection to a tent cluster.

* * * * *